Dec. 20, 1955   A. R. D'EATH   2,727,781
TAIL GATE RAMP
Filed June 3, 1953
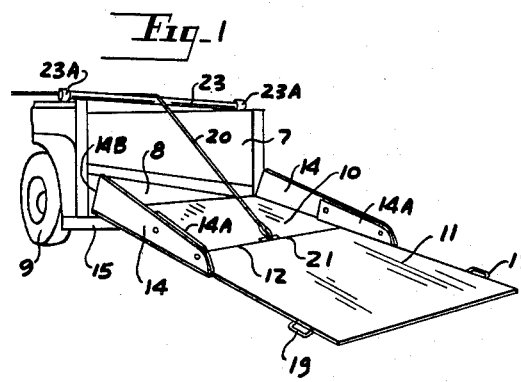
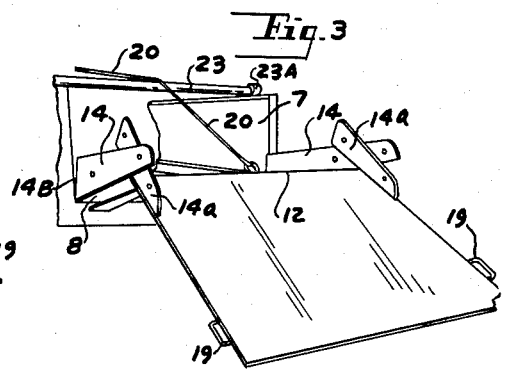
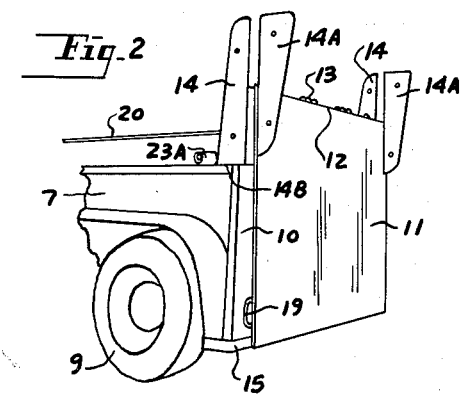
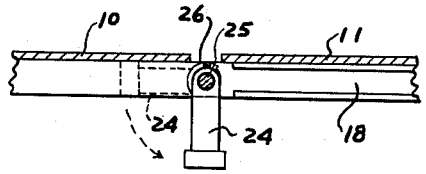
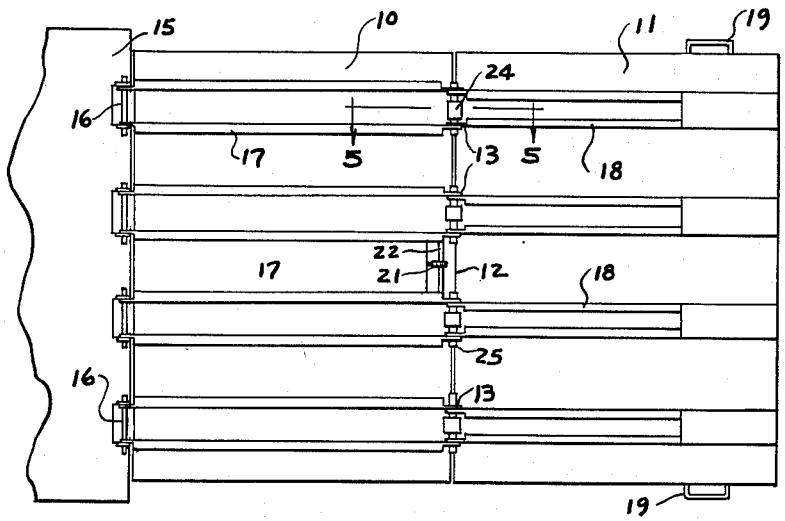
INVENTOR.
ALBERT R. D'EATH.
BY
Edward M. Apple
ATTORNEY

United States Patent Office 2,727,781
Patented Dec. 20, 1955

2,727,781

TAIL GATE RAMP

Albert R. D'Eath, Detroit, Mich.

Application June 3, 1953, Serial No. 359,389

1 Claim. (Cl. 296—61)

This invention relates to commercial automotive vehicles, and has particular reference to a loading ramp for a low bed truck or trailer, which also doubles as a tail gate for the vehicle.

An object of the invention is to generally improve devices of the character indicated and to provide a ramp which is simple in construction, economical to manufacture, and efficient in operation.

Another object of the invention is to provide a device of the character indicated, which is ideal for making deliveries to and from locations having no dock facilities.

Another object of the invention is to provide a ramp for loading and unloading heavy articles of machinery and the like, and for economically handling merchandise and materials which are carried on pallets.

Another object of the invention is to provide a ramp which has a comparatively great length whereby it is possible to provide a substantially gradual incline which is admirably suited for loading and unloading commodities with a hand truck or a fork truck.

Another object of the invention is to provide a comparatively long ramp which is hinged in the middle for easy transportation and storage.

Another object of the invention is the provision of a device of the character indicated, which is constructed of a pair of hinged leaves which, when in elevated position, form a rigid tail gate for the vehicle and which, when released, will automatically align themselves to form a substantially long, gradually inclined ramp.

Another object of the invention is the provision of a ramp which consists of a pair of reinforced hinged plates which are constructed and arranged so that the reinforcements of one nests or dove-tails inside the other when being transported.

Another object of the invention is the provision of a device of the character indicated, which is formed of a pair of hinged plates having a plurality of pivotable legs which automatically position themselves beneath the hinged portion of the ramp for heavy load carrying action.

Another object of the invention is to provide a tail gate ramp which consists of a pair of hinged plates having supporting means secured for pivotable action adjacent the hinged portion of the ramp.

Another object of the invention is to provide a device of the character indicated, which is constructed of a pair of plates, which are hinged together, and are pivoted with stop means, so that the outer end may be positioned at either truck level or ground level for loading and unloading merchandise.

Another object of the invention is to provide a device of the character indicated, which has a plurality of centrally positioned supports near the hinge line, which automatically fold up inside of the device when it is being transported.

The foregoing and other objects and advantages of the invention will become more apparent as the description proceeds, reference being made from time to time to the accompanying drawing forming part of the within disclosure, in which drawing:

Fig. 1 is a perspective view of the rear end of a low bed motor vehicle which is equipped with a device embodying the invention, and showing the ramp in extended position.

Fig. 2 is a view similar to Fig. 1, but showing the ramp in folded position to serve as a tail gate for the vehicle.

Fig. 3 is a perspective view similar to Fig. 1, but showing the ramp in partially extended position.

Fig. 4 is a plan view of the under side of the ramp when it is in extended position.

Fig. 5 is a section taken substantially on the line 5—5 of Fig. 4, and showing how the supporting legs swing into substantially vertical position when the ramp is extended, the dotted lines showing how the legs are carried when the ramp is in transporting position as shown in Fig. 2.

Referring now more particularly to the drawings, it will be understood that in the embodiment herein disclosed, the reference character 7 indicates the rear end of the body of the motor vehicle having a low bed 8, and wheels 9, to which is mounted the device embodying the invention.

The device embodying the invention consists of a pair of heavy metal plates 10 and 11, which are hinged together along the line 12 by means of heavy hinges 13. The plates 10 and 11 are provided with stops 14 and 14A, each of which stops overhangs the edge of its respective plate and is arranged to bear against the upper surface of the other plate, whereby to hold the plates in alignment when they are in extended position as shown in Fig. 1. It will be noted that the stops 14A nest inside the stops 14 when the ramp is in extended position as shown in Fig. 1.

The plate 10 is hinged to the bed frame 15, as at 16, and the plates 10 and 11 are reinforced underneath by members 17 and 18. Handles 19 are also provided on the plate 11 so that the end thereof may be manually lifted if desired.

The device embodying the invention is preferably power actuated by means of a cable 20 which is secured at one end, as at 21, to a bar 22 positioned in a cut-out formed in the plate 10. The opposite end of the cable 20 is secured to a power driven winch (not shown). In this embodiment, I show the cable extending over a locking bar 23 which is supported in suitable brackets 23A carried on the sides 7 of the vehicle.

Although I have shown the cable 20 as being secured substantially in the center line of the plates 10 and 11, it will be understood that the invention also contemplates the use of a pair of cables which will be secured at opposite sides of the plate 10 and will engage suitable pulleys on either side of the vehicle instead of having the cable pass over the locking bar 23. The straight ends 14B of the stops 14 ride on the upper edges of the sides 7 of the vehicle and serve to hold the ramp in upright position, as shown in Fig. 2, and prevent the device from falling into the bed of the vehicle when pulled inwardly by the cable 20, so that the ramp may be carried in substantially vertical position to serve as a tail gate, as shown in Fig. 2.

In order to support the plates 10 and 11 when in extended position, I provide a plurality of legs 24, which are pivoted on the hinge pintles 25, as shown in Figs. 4 and 5. The legs 24 are adapted to swing downwardly into substantially vertical position when the plates 10 and 11 are extended, and are arranged to swing into parallel position with the plate 10 when the ramp is in elevated position as shown in Fig. 2. The legs 24 may be provided with stops 26 which prevent the legs from swinging past vertical position when the ramp is extended. It will be noted that the free end of the plate 11 may rest upon the ground or may be positioned on top of a low bed level dock or the like, when the ramp is extended. When the end is positioned on a dock, I employ blocks under the legs 24 to extend their length. The locking bar 23 is removed and the cable 20 is unhooked from the ramp when the vehicle is being loaded.

The device functions as follows:

When heavy commodities are to be loaded on the vehicle bed 8, the vehicle is backed up to a loading dock or other location, and the cable supporting the ramp is lengthened by means of the winch (not shown). In as much as the ramp normally rides in a position to the rear of dead center, it will start to descend by force of gravity when the cable 20 is extended. The ramp is preferably supported by the cable 20 all during its descent so that there is no danger of a heavy impact breaking the hinges or stops. When the plates 10 and 11 have reached the end of their downward descent, they will be in substantial alignment with one another. Upon the downward descent of the plates the centrally positioned legs 24 will swing by gravity into substantially vertical position to help in the support of the ramp. In this position, the free end of the plate 11 may either rest on the ground or may be supported upon a bed level dock or the like. If rested on a bed level dock, blocks may be inserted under the legs to lengthen them. After the ramp has reached its downward descent the cable 20 and locking bar 23 are disconnected so that free access may be had to the vehicle body. When the loading is completed, the locking bar 23 and the cable 20 are again connected and the ramp may be swung into substantially vertical position for transportation as shown in Fig. 2.

Having described my invention, what I claim and desire to secure by Letters Patent is:

A tail gate ramp for a vehicle body comprising a pair of metal plates, one of which is hinged to said body and the other one of which is hinged to said first plate, there being stop members secured edgewise along the side edges of one of said plates near the last named hinge, and, overriding the other said plate, whereby to hold said plates in alignment when used as a ramp, each said plate being reinforced on its underside with aligned channel like members, the channel members of one plate nesting inside the channel members of the other plate, when said plates are carried vertically as a tail gate.

References Cited in the file of this patent

UNITED STATES PATENTS

| 112,968 | Sener | Mar. 21, 1871 |
| 365,657 | Watson | June 28, 1887 |
| 712,284 | Fisher | Oct. 28, 1902 |
| 1,723,469 | DeRoos | Aug. 6, 1929 |
| 2,100,694 | Judd | Nov. 30, 1937 |
| 2,215,631 | Young | Sept. 24, 1940 |
| 2,573,714 | Karl | Nov. 6, 1951 |
| 2,603,529 | Troth et al. | July 15, 1952 |

FOREIGN PATENTS

| 10,143 | France | Feb. 17, 1909 |
| 814,016 | France | Mar. 8, 1937 |